(12) United States Patent
Takechi

(10) Patent No.: US 9,825,323 B2
(45) Date of Patent: Nov. 21, 2017

(54) QUINONE-BASED HIGH ENERGY DENSITY LIQUID ACTIVE MATERIAL FOR FLOW BATTERY

(71) Applicant: Toyota Motor Engineering & Manufacturing North America, Inc., Erlanger, KY (US)

(72) Inventor: Kensuke Takechi, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 277 days.

(21) Appl. No.: 14/590,962

(22) Filed: Jan. 6, 2015

(65) Prior Publication Data

US 2016/0197371 A1 Jul. 7, 2016

(51) Int. Cl.
*H01M 8/18* (2006.01)
*H01M 8/20* (2006.01)

(52) U.S. Cl.
CPC ........ *H01M 8/188* (2013.01); *H01M 2250/20* (2013.01); *H01M 2300/0025* (2013.01); *Y02E 60/528* (2013.01); *Y02T 90/32* (2013.01)

(58) Field of Classification Search
CPC ......... H01M 8/188; H01M 2300/0025; H01M 2250/20; Y02E 60/528; Y02T 90/32
See application file for complete search history.

(56) References Cited

U.S. PATENT DOCUMENTS

| 4,888,255 A * | 12/1989 | Yoshimitsu | ............. H01M 6/14 429/101 |
| 2007/0012579 A1* | 1/2007 | Rosvall | ..................... C01B 7/03 205/474 |
| 2012/0196182 A1 | 8/2012 | Yao et al. | |
| 2014/0308581 A1* | 10/2014 | Yao | ........................ H01M 4/606 429/213 |

FOREIGN PATENT DOCUMENTS

WO WO2011131959 A1 10/2011

* cited by examiner

*Primary Examiner* — Brittany Raymond
(74) *Attorney, Agent, or Firm* — Christopher G. Darrow; Darrow Mustafa PC

(57) ABSTRACT

A liquid catholyte as well as electrochemical cells and automotive vehicles employing the liquid catholyte are disclosed. The liquid catholyte includes a quinone as redox active material and a fluoroalkylsulfonyl salt as charge balancing agent and is characterized by a liquid form of the redox active material regardless of redox state. The liquid catholyte can thus have utility as a catholyte in a flow battery.

14 Claims, 5 Drawing Sheets

QUINONE-BASED HIGH ENERGY DENSITY LIQUID ACTIVE MATERIAL FOR FLOW BATTERY

TECHNICAL FIELD

The present invention relates in general to liquid active material composition having high energy density and utility for use in a flow battery.

BACKGROUND

Flow cells or flow batteries are electrochemical cells that do not have solid electrodes but instead have liquid active materials: redox active materials that are liquid in both reduced and oxidized states. Because there are no solid electrodes to be regenerated via charging, a flow battery can be recharged by draining the discharged liquid active material and refueling with charged liquid active material. This capability to be quickly recharged by refueling makes the use of flow batteries a potentially valuable approach to powering electrical systems that are in near constant use such that extended recharging times would be unacceptable, for example electrically powered municipal transportation vehicles.

However, because flow batteries lack a pool of reduced active material in the form of a solid anode and a sink for oxidized active material in the form of a solid cathode, they typically suffer from low energy density. This low energy density results in a need for frequent refueling and thus largely offsets the value derived from the capability of rapid recharging by refueling.

One approach to offsetting the low energy density of flow batteries is to equip them with large reservoirs of active material. This approach may be impractical for mobile systems or systems which otherwise require modest size, however.

SUMMARY

A liquid catholyte and an electrochemical cell employing the liquid catholyte is disclosed. An automotive vehicle employing an electrochemical cell of the present disclosure is likewise disclosed.

In one aspect, a liquid catholyte is provided. The liquid catholyte includes a quinone as redox active agent and a fluoroalkylsulfonyl salt as charge balancing agent. The liquid catholyte can additionally include a liquid fluidizer as a viscosity reducing agent. The liquid catholyte is characterized by the redox active agent being present in a liquid form when in any of its oxidation states.

In another aspect, an electrochemical cell is provided. The electrochemical cell includes an anode chamber and a cathode chamber, the cathode chamber further including a cathodic current collector and a liquid catholyte. The liquid catholyte includes a quinone as redox active agent and a fluoroalkylsulfonyl salt as charge balancing agent. The liquid catholyte can additionally include a liquid fluidizer as a viscosity reducing agent.

In another aspect, an automotive vehicle is provided. The automotive vehicle includes an electrochemical cell having an anode chamber and a cathode chamber, the cathode chamber further including a cathodic current collector and a liquid catholyte. The liquid catholyte includes a quinone as redox active agent and a fluoroalkylsulfonyl salt as charge balancing agent. The liquid catholyte can additionally include a liquid fluidizer as a viscosity reducing agent.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
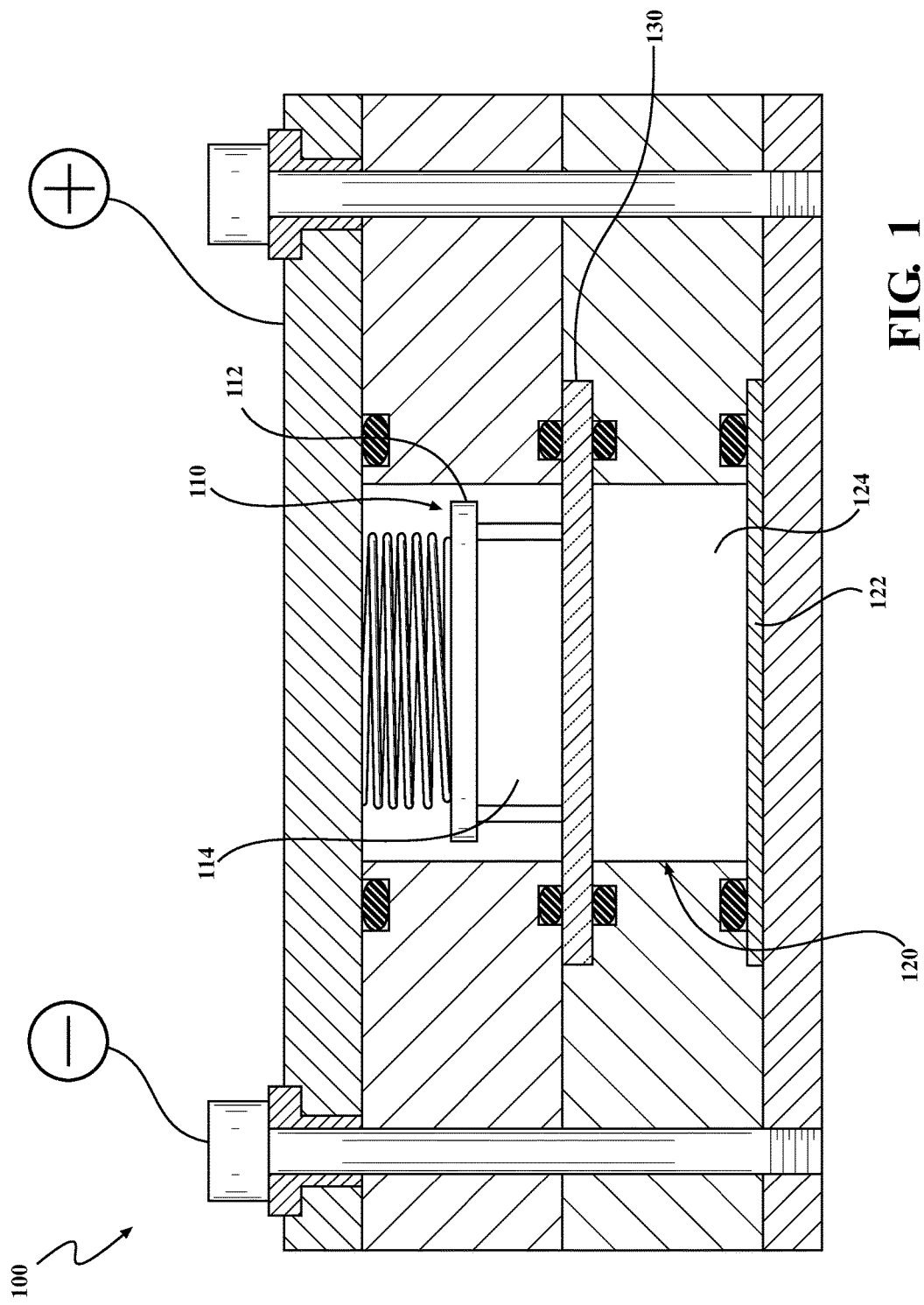
FIG. 1 is a schematic view of an electrochemical cell having an anode chamber and a cathode chamber, the cathode chamber including a liquid catholyte of the present invention.

The present disclosure describes liquid catholytes and flow cell batteries having such liquid catholytes, the liquid catholytes having high energy density based on a redox active material that is present at high volumetric and/or molar concentration. The liquid catholytes of the present disclosure can have utility as catholytes in flow batteries.

Liquid catholytes of the present disclosure include a quinone and a fluoroalkylsulfonyl salt. The liquid catholytes are fluid under battery operating conditions, thus solvent is not required and concentration is high yielding maximum energy density. The quinones are divalent, improving energy density further. The electrolytes of the present disclosure can be useful as high energy density catholytes in flow batteries.

Accordingly, a liquid catholyte is disclosed herein, the liquid catholyte having a quinone and a fluoroalkylsulfonyl salt. The molar ratio of quinone to fluoroalkylsulfonyl salt can be within a range of 0.2:1 to 2:1. It is to be understood that the term "quinone" as used herein, unless context dictates otherwise, can refer to any of the quinone, the corresponding semiquinone, and the corresponding diol. The quinone included in the liquid catholyte can be any quinone such as a monocyclic, bicyclic, or polycyclic quinone. In some instances, the quinone will be a substituted or unsubstituted 1,4-benzoquinone according to Structure I:

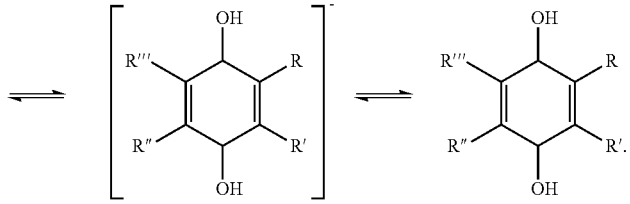

wherein each of R, R', R", and R''', is independently alkyl, alkoxy, or hydrogen. In some implementations, at least one of R, R', R", and R''' will be alkyl or alkyoxy. Non-limiting examples of 1,4-benzoquinones suitable for use in the liquid catholyte include 1,4-benzoquinone; 2-methyl-1,4-benzoquinone, 2-t-butyl-1,4-benzoquinone; 2,6-dimethyl-1,4-benzoquinone; 2,6-di-t-butyl-1,4-benzoquinone; 2-i-propyl-5-methyl-1,4-benzoquinone; 2,3-dimethoxy-5-methyl-1,4-benzoquinone, and a mixture thereof.

The fluoroakylsulfonyl salt included in the liquid catholyte can include any metal cation paired with a fluoroalkylsulfonyl anion. Non-limiting examples of suitable fluoroalkysufonyl salts include lithium bis(trifluoromethylsulfonyl)imide (LiTFSI), lithium bis(pentafluoroethylsulfonyl)imide (LiBETI), lithium trifluoromethylsulfonate, sodium bis(trifluoromethylsulfonyl)imide (NaTFSI), and magnesium bis(bis(trifluoromethylsulfonyl)imide) (Mg (TFSI)$_2$), and a mixture thereof.

In some implementations, the liquid catholyte can additionally include a liquid fluidizer. As used herein, the expression "liquid fluidizer" refers to a material that is liquid under standard conditions of temperature and pressure that, when present, can reduce viscosity of the liquid catholyte. Non-limiting examples of suitable liquid fluidizer can include water, acetonitrile, and liquid organic molecules having a carbonate moiety, such as a substituted propionate. In some implementations, the liquid fluidizer can be present at a molar ratio relative to fluoroalkylsulfonyl salt of less than 20:1. In some implementations, the liquid fluidizer can be present within a range of 0-10% (v/v) of liquid catholyte. Without being bound to any particular theory, while the phrase "liquid fluidizer" as used herein is largely similar to the term "solvent", it is not believed that a liquid fluidizer, when included in the liquid catholyte, functions as a solvent because it is in many instances present at insufficiently high concentration to solvate other components of the liquid catholyte.

Without being bound to any particular theory, it is believed that when a liquid catholyte of the present disclosure is employed as a catholyte in an electrochemical cell, the quinone serves as a redox-active agent, capable of undergoing a 2-electron redox reaction according to Reaction A:

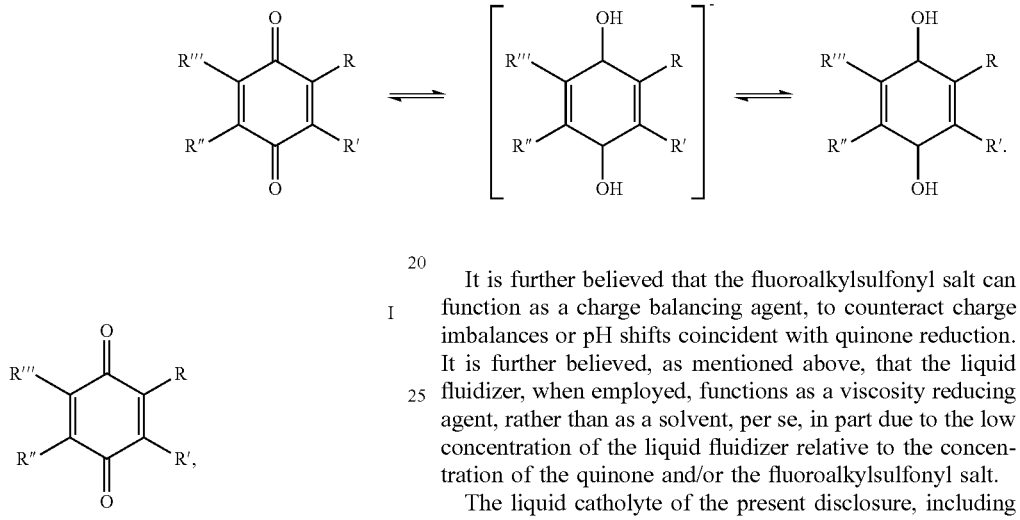

It is further believed that the fluoroalkylsulfonyl salt can function as a charge balancing agent, to counteract charge imbalances or pH shifts coincident with quinone reduction. It is further believed, as mentioned above, that the liquid fluidizer, when employed, functions as a viscosity reducing agent, rather than as a solvent, per se, in part due to the low concentration of the liquid fluidizer relative to the concentration of the quinone and/or the fluoroalkylsulfonyl salt.

The liquid catholyte of the present disclosure, including both quinone and fluoroalkylsulfonyl salt components, will generally be a liquid at typical battery operating temperatures regardless of the redox state of the quinone. This property enables the liquid catholyte to support electrochemical redox chemistry in the cathode chamber of an electrochemical cell without use of a solid redox active material incorporated in the cathode, such as can occur in a flow cell battery. The liquid property of the liquid catholyte is present despite the fact that the quinone and fluoroalkylsulfonyl salt components, when in pure form, are generally solid at typical battery operating temperatures, having melting points uniformly about 100° C. and in many instances well above 200° C. Without being bound by any particular theory, it is believed that this liquid property of the liquid catholyte may be due to formation of a strong coordination complex resulting in formation of a solvate ionic liquid, the coordination complex potentially having a structure of the type shown in Structure II:

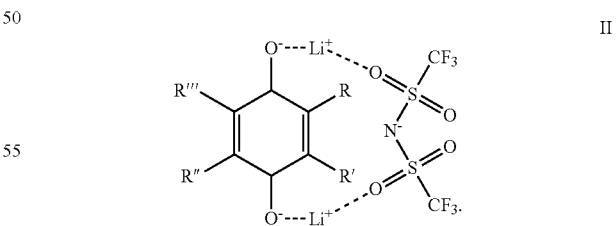

It is to be noted that while Li$^+$ cations are shown as present for exemplary purposes in Structure II, other cations derived from the fluoroalkylsulfonyl salt, such as Na$^+$ or Mg$^{2+}$ can be present instead or in addition.

Additionally disclosed, and as illustrated in FIG. 1, is an electrochemical cell 100. The electrochemical cell includes a cathode chamber 110 and an anode chamber 120. The cathode chamber 110 further includes a cathodic current collector 112, the cathodic current collector configured to conduct electrons into the cathode chamber 110 to support electrochemical reduction of a redox active material. The cathode chamber 110 further includes a liquid catholyte 114, in contact with the cathodic current collector 112. The liquid catholyte 114 can be any liquid catholyte of the type disclosed above, containing a quinone, a fluoroalkylsulfonyl salt, and, optionally, a liquid fluidizer. During a discharge of the electrochemical cell 100, electrons can flow into the cathodic current collector 112, for example from an external conductor in electrical communication with the anode chamber 120. Electrons can then be passed from the cathodic current collector 112 to quinone molecules of the liquid catholyte 114, supporting electrochemical reduction of the quinone to the semiquinone and/or the hydroquinone, as shown above in Reaction A.

The anode chamber 120 of the electrochemical cell 100 can be any type of suitable anode chamber effective to produce free electrons from an electrochemical oxidation reaction. Generally the anode chamber will include an anodic electrode 122 in contact with an anodic electrolyte 124. In some implementations, the anodic electrode 122 can comprise a solid anode, the solid anode containing solid redox active material when fully or partially reduced. A non-limiting example of such an implementation is an anode chamber 120 comprising a Li/Li$^+$ half-cell having an anodic electrode 122 that contains solid lithium when at least partially charged, i.e. partially reduced. In other implementations, the anodic electrode 122 can be an anodic current collector and the anodic electrolyte 124 can be a liquid anolyte, the liquid anolyte containing an anodic redox active material that is liquid regardless of oxidation state. In such latter implementations, the electrochemical cell 100 can be regarded as a flow cell.

In many implementations, the cathode chamber 110 and the anode chamber 120 will be separated from one another by a semi-permeable membrane 130 disposed between them. The semi-permeable membrane 130 will in many instances be permeable to a cation of the fluoroalkylsulfonyl salt, but will be impermeable to other components of the liquid catholyte 114.

It is to be appreciated that the electrochemical cell 100 can comprise any type of electrochemical cell, including, but not limited to, a primary battery, a secondary battery, and a fuel cell.

Figure 2:
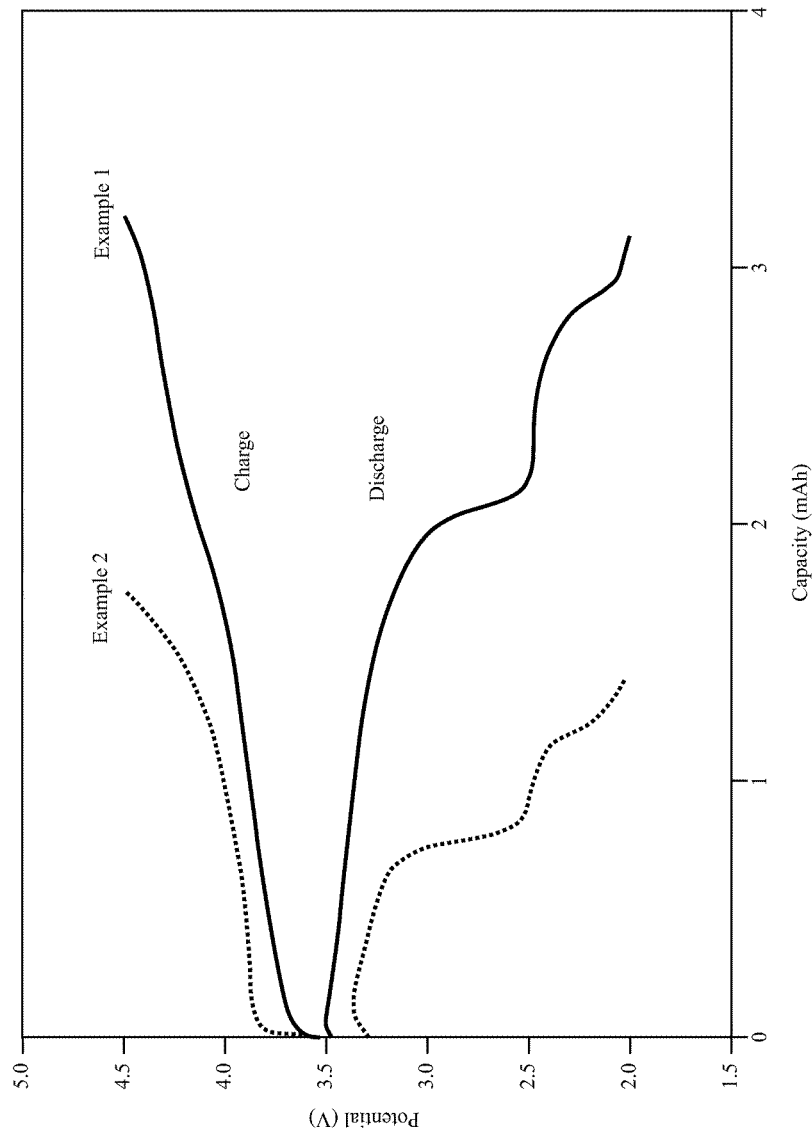
FIG. 2 is a graph of $5^{th}$ cycle charge/discharge curves of two example electrochemical cells of the type shown in FIG. 1, in which the anode chamber includes an Li/Li$^+$ half-cell and the liquid catholyte is 50 µL 2-methyl-1,4-benzoquinone:LiTFSI:H$_2$O at a 1:1:4 molar ratio, benzoquinone is 3.1 M; or 50 µL 2-t-butyl-1,4-benzoquinone:LiTFSI:H$_2$O at a 1:1:4 molar ratio, benzoquinone at 2.7 M.
Figure 3:
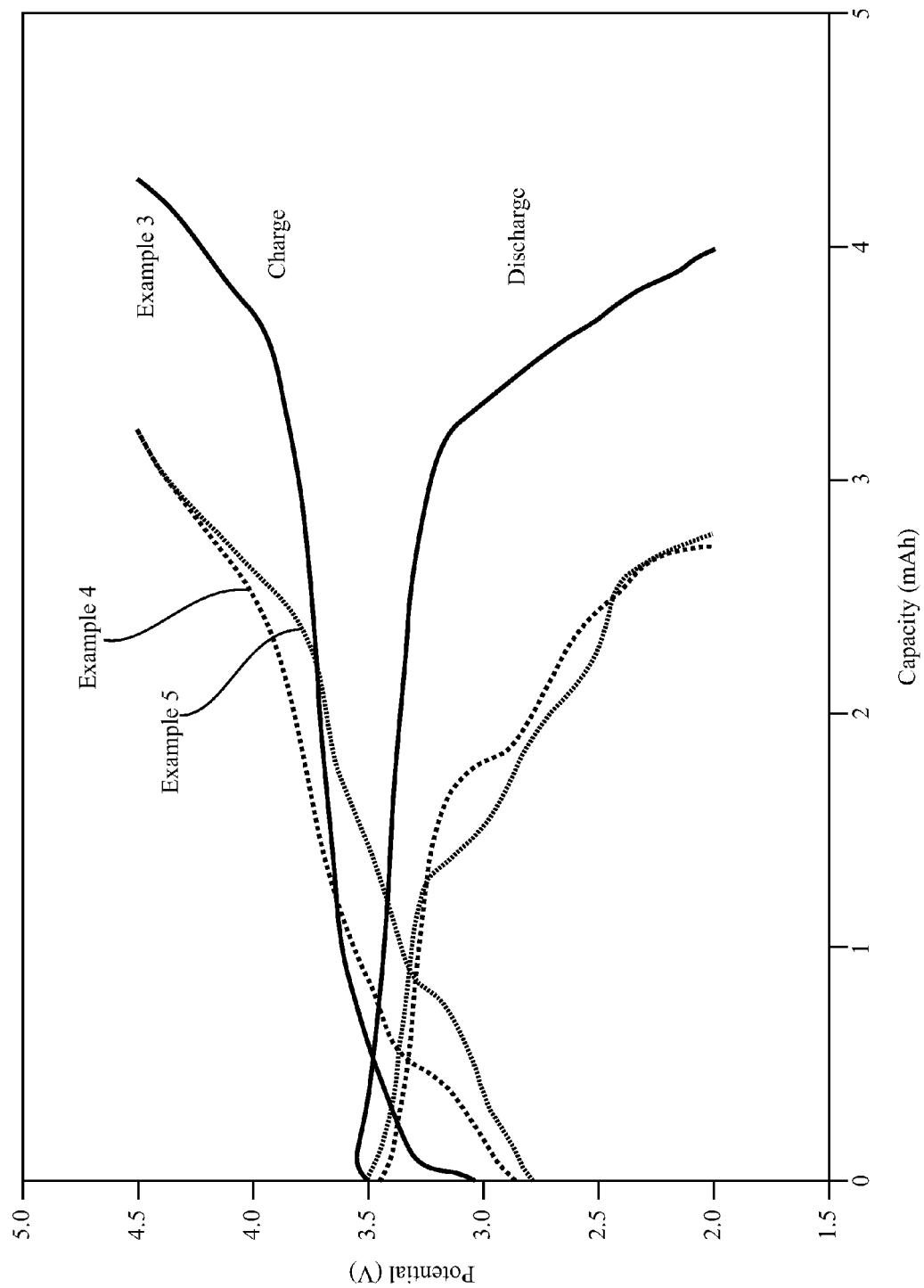
FIG. 3 is a graph of $5^{th}$ cycle charge/discharge curves of two example electrochemical cells of the type shown in FIG. 1, in which the anode chamber includes a Li/Li$^+$ half-cell and the liquid catholyte is either 50 µL 2,6-dimethyl-1,4-benzoquinone:LiTFSI:H$_2$O at a 1:1:4 molar ratio, with the quinone present at 2.9 M; 50 µL 2,6-dimethyl-1,4-benzoquinone:LiTFSI:H$_2$O at a 1:2:4 molar ratio, benzoquinone at 2.1 M; or 50 µL 2,6-dimethyl-1,4-benzoquinone:LiTFSI:H$_2$O at a 1:2:6 molar ratio, benzoquinone at 1.9 M.
Figure 4:
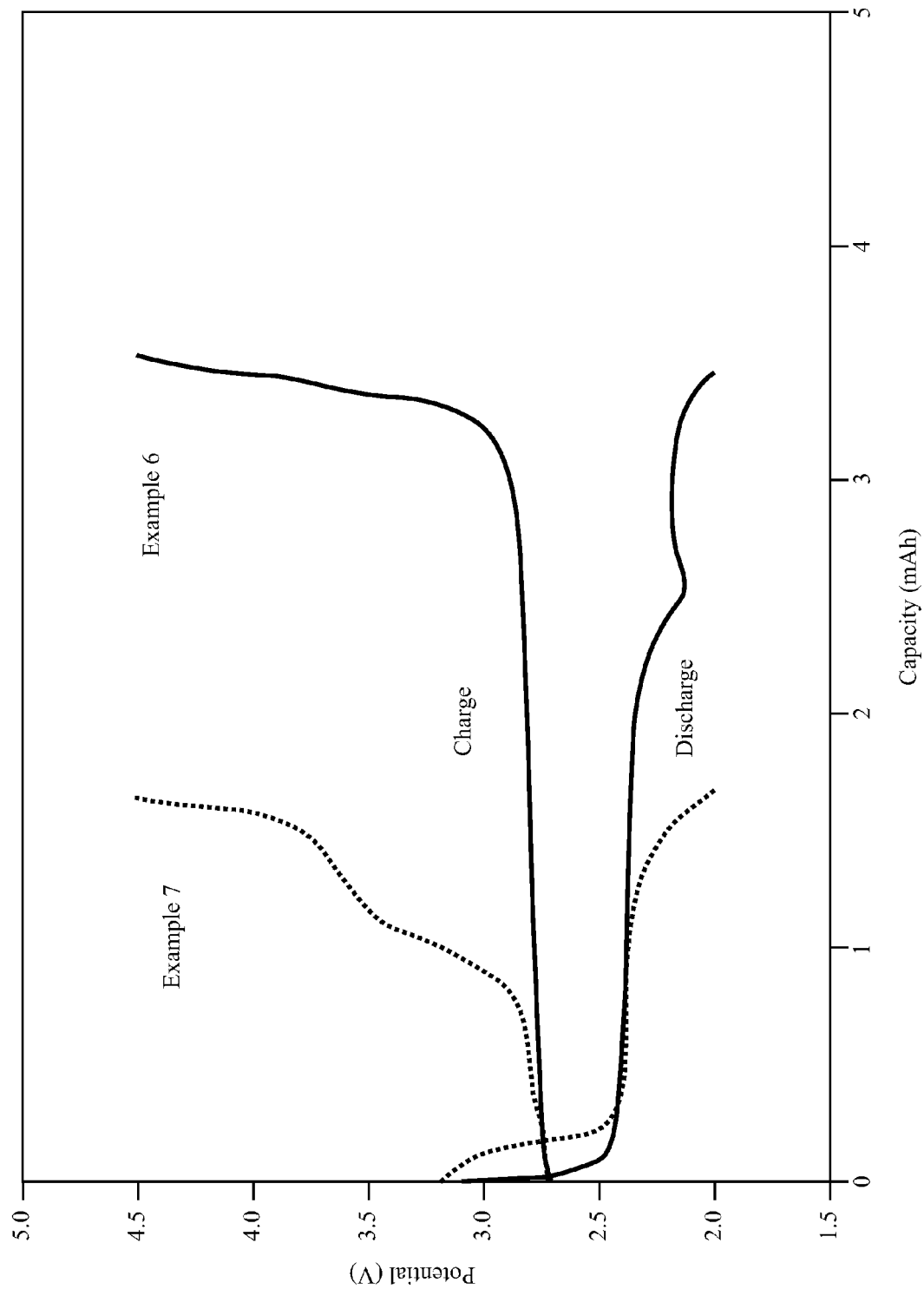
FIG. 4 is a graph of $5^{th}$ cycle charge/discharge curves of two example electrochemical cells of the type shown in FIG. 1, in which the anode chamber includes an Li/Li$^+$ half-cell and the liquid catholyte is 50 µL 2,6-di-t-butyl-1,4-benzoquinone:LiTFSI:H$_2$O:LiTFSI:H$_2$O at a 1:1:4 molar ratio, benzoquinone at 2.2 M; or 50 µL 2,6-di-t-butyl-1,4-benzoquinone:LiTFSI:H$_2$O:LiTFSI:H$_2$O at a 1:2:4 molar ratio, benzoquinone at 1.7 M.

Referring now to FIGS. 2-5, fifth-cycle charge/discharge curves (charge event precedes the discharge event) are shown for ten variations of an electrochemical cell 100 of the present disclosure. While the details of construction of these examples are discussed in greater details in the Examples section below, each electrochemical cell for which data are shown in FIGS. 2-4 has an anode chamber 120 comprising a Li/Li$^+$ half-cell separated from the cathode chamber by a lithium-permeable membrane. Each example cathode chamber 110 includes a cathodic current collector 112 composed of carbon paper and 50 μL of a liquid catholyte 114 composed of quinone:LiTFSI:water at varying molar ratios and/or with variance in the identity and absolute concentration of the quinone.

FIG. 2 shows charge/discharge data for liquid catholytes in which the quinone is a 1,4-benzoquinone substituted with an alkyl group (methyl or t-butyl) at R while each of R', R", and R'" is hydrogen. Each electrochemical cell of FIG. 2 shows substantial capacity and good rechargeability. It is to be noted that the average number of electrons transferred per molecule of redox active material (quinone) is about 0.75 and 0.39 for the charge/discharge experiments with Examples 1 and 2, respectively. This suggests that fewer than all quinone molecules undergo even a single-electron reduction/oxidation of the possible two electron reduction/oxidation in the fifth cycle.

FIG. 3 shows analogous charge/discharge curves for liquid catholytes in which the quinone is a 1,4-benzoquinone substituted with a methyl group at R and R'" and in which each of R' and R" is hydrogen. The average number of electrons transferred per molecule of redox active material (quinone) is about 1.0, 1.0, and 1.1 for the charge/discharge experiments with Examples 3, 4 and 5, respectively. This indicates that at least a portion of the divalency of the quinone is utilized within the examined electrical potential range in the latter case.

FIG. 4 shows charge/discharge curves for liquid catholytes in which the quinone is a 1,4-benzoquinone substituted with a t-butyl group at R and R'" and each of R' and R" is hydrogen. The average number of electrons transferred per molecule of redox active material (quinone) is about 1.2 and 0.79 for the charge/discharge experiments with Examples 6 and 5, respectively, indicating a slightly higher utilization of the divalency of the quinone in the former case compared to the example of FIG. 3.

Figure 5:
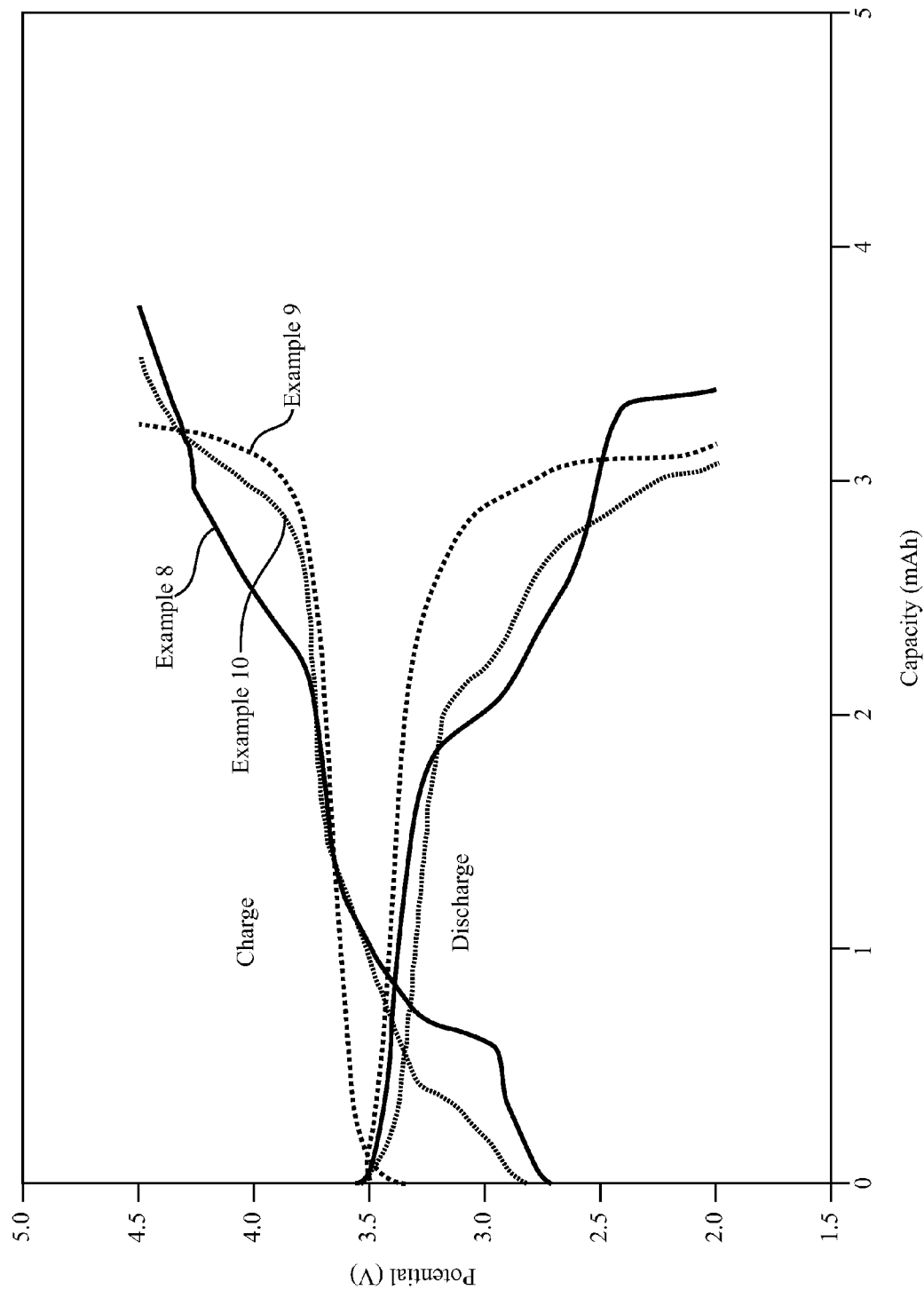
FIG. 5 is a graph of $5^{th}$ cycle charge/discharge curves of two example electrochemical cells of the type shown in FIG. 1, in which the anode chamber includes an Li/Li$^+$ half-cell and the liquid catholyte is 2-i-propyl-5-methyl-1,4-benzoquinone:LiTFSI:H$_2$O at a 1:1:4 molar ratio, benzoquinone at 2.7 M; 2-i-propyl-5-methyl-1,4-benzoquinone:LiTFSI:H$_2$O at a 1:1:6 molar ratio, benzoquinone at 2.5 M; or 2-i-propyl-5-methyl-1,4-benzoquinone:LiTFSI:H$_2$O at a 1:2:6 molar ratio, benzoquinone at 1.8 M.

FIG. 5 presents the charge/discharge curves for liquid catholytes in which the quinone is a 1,4-benzoquinone substituted with an isopropyl group at R and a methyl group at R" and in which each of R' and R'" is hydrogen. The average number of electrons transferred per molecule of redox active material (quinone) is about 1.0, 0.92, and 1.3 for the charge/discharge experiments with Examples 8, 9 and 10, respectively. This indicates that a yet higher portion of the divalency of the quinone was utilized within the examined electrical potential range in the last case as compared to the example of FIG. 4.

In all cases, the capacity of the electrochemical cell 100 benefits from the substantially high concentration of the redox active material, ranging generally from about 2 to 3 M.

Also disclosed is an automotive vehicle having an electrochemical cell 100 of the type disclosed above. In many such implementations, the electrochemical cell 100 will comprise a flow cell having an anodic current collector in contact with a liquid anolyte. In such implementations, the electrochemical cell 100 can be recharged by physically draining and replacing the liquid catholyte and/or the liquid anolyte.

The present disclosure is further illustrated with respect to the following examples. It is to be understood that these examples are provided to illustrate specific illustrations of the present disclosure and should not be construed as presenting limits on the scope of the present disclosure.

Examples 1-10

The following examples are of electrochemical cells 100 of the present disclosure. In each example, the anode chamber 120 included a 0.25 mm lithium metal anode in contact with 1 M LiTFSI in propylene carbonate. The cathode chamber 110 included a cathodic current collector 112 composed of carbon paper and in contact with a liquid catholyte of Table I. The cathode chamber 110 and anode chamber 120 were separated by a 1 mm thick LATP-based solid state Li-ion conductor (OHARA glass). Charge/discharge cycles for each Example electrochemical cell weremonitored at 25° C. and at current density of 0.05 mA·cm$^{-2}$.

In every Example, the electrochemical cell 100 was charged until the electrical potential reached a maximum of 4.5 volts (V) and discharged until the electrical potential reach a minimum of 2.0 V.

TABLE 1

Liquid Catholytes Employed in Electrochemical Cells of Examples 1-10

| Example | Quinone | Fluoroalkylsulfonyl salt | liquid fluidizer | molar ratio* | Quinone concentration (M) |
|---|---|---|---|---|---|
| 1 | 2-methyl-1,4-benzoquinone | LiTFSI | water | 1:1:4 | 3.1 |
| 2 | 2-t-butyl-1,4-benzoquinone | LiTFSI | water | 1:1:4 | 2.7 |
| 3 | 2,6-dimethyl-1,4-benzoquinone | LiTFSI | water | 1:1:4 | 2.9 |
| 4 | 2,6-dimethyl-1,4-benzoquinone | LiTFSI | water | 1:2:4 | 2.1 |
| 5 | 2,6-dimethyl-1,4-benzoquinone | LiTFSI | water | 1:2:6 | 1.9 |
| 6 | 2,6-di-t-butyl-1,4-benzoquinone | LiTFSI | water | 1:1:4 | 2.2 |
| 7 | 2,6-di-t-butyl-1,4-benzoquinone | LiTFSI | water | 1:2:4 | 1.7 |
| 8 | 2-i-propyl-5-methyl-1,4-benzoquinone | LiTFSI | water | 1:1:4 | 2.7 |
| 9 | 2-i-propyl-5-methyl-1,4-benzoquinone | LiTFSI | water | 1:1:6 | 2.5 |
| 10 | 2-i-propyl-5-methyl-1,4-benzoquinone | LiTFSI | water | 1:2:6 | 1.8 |

*molar ratio as presented is of quinone:fluoroalkylsulfonyl salt:liquid fluidizer As noted, fifth cycle charge/discharge curves of Examples 1 and 2 are shown in FIG. 2, of Examples 3-5 in FIG. 3, of Examples 6 and 7 in FIG. 4, and of Examples 8-10 in FIG. 5.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A liquid catholyte comprising:
a fluoroalkylsulfonyl salt; and
a substituted or unsubstituted 1,4-benzoquinone, present at a molar ratio within a range of 0.2:1 to 2:1 relative to the fluoroalkylsulfonyl salt, and having a structure:

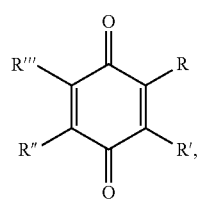

wherein each of R, R', R", and R"', is independently alkyl, alkoxy, or hydrogen, and wherein the 1,4-benzoquinone functions as a redox active material present in a liquid form whether reduced or oxidized.

2. The liquid catholyte as recited in claim 1, wherein the 1,4-benzoquinone is selected from the group consisting of 2-methyl-1,4-bezoquinone; 2-t-butyl-1,4-benzoquinone; 2,6-dimethyl-1,4-benzoquinone; 2,6-di-t-butyl-1,4-benzoquinone; 2-i-propyl-5-methyl-1,4-benzoquinone; and 2,3-dimethoxy-5-methyl-1,4-benzoquinone; and a mixture thereof.

3. The liquid catholyte as recited in claim 1, wherein the fluoroalkylsulfonyl salt is selected from the group consisting of lithium bis(trifluoromethylsulfonyl)imide (LiTFSI), lithium bis(pentafluroethylsulfonyl)imide (LiBETI), lithium trifluromethylfulfonate, sodium bis(trifluoromethylsulfonyl)imide (NaTFSI), magnesium bis(bis(trifluoromethylsulfonyl)imide (Mg(TFSI)$_2$), and a mixture thereof.

4. The liquid catholyte as recited in claim 1, further comprising a liquid fluidizer.

5. The liquid catholyte as recited in claim 4, wherein the liquid fluidizer comprises water.

6. The liquid catholyte of claim 4, wherein a volume ratio of liquid fluidizer:liquid catholyte is 10% or less.

7. A galvanic cell comprising:
an anode chamber;
a cathode chamber having a cathodic current collector and a liquid catholyte, the liquid catholyte comprising:
a fluoroalkylsulfonyl salt; and
a substituted or unsubstituted 1,4-benzoquinone, present at a molar ratio within a range of 0.2:1 to 2:1 relative to the fluoroalkylsulfonyl salt, and having a structure:

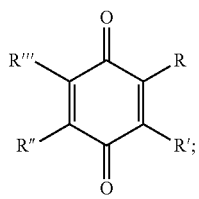

wherein each of R, R', R", and R'", is independently alkyl, alkoxy, or hydrogen; and a semi-permeable separator disposed between the anode chamber and the cathode chamber, wherein, during cell discharge, redox active material is oxidized in the anode chamber and reduced in the cathode chamber to produce energy.

8. The galvanic cell of claim 7, wherein the 1,4-benzoquinone is selected from the group consisting of 2-methyl-1,4-bezoquinone; 2-t-butyl-1,4-benzo quinone; 2,6-dimethyl-1,4-benzoquinone; 2,6-di-t-butyl-1,4-benzoquinone; 2-i-propyl-5-methyl-1,4-benzoquinone; 2,3-dimethoxy-5-methyl-1,4-benzoquinone; and a mixture thereof.

9. The galvanic cell of claim 7, wherein the fluoroalkylsulfonyl salt is selected from the group consisting of lithium bis(trifluoromethylsulfonyl)imide (LiTFSI), lithium bis(pentafluroethylsulfonyl)imide (LiBETI), lithium trifluromethylfulfonate, sodium bis(trifluoromethylsulfonyl)imide (NaTFSI), magnesium bis(bis(trifluoromethylsulfonyl)imide (Mg(TFSI)$_2$), and a mixture thereof.

10. The galvanic cell of claim 7, wherein the galvanic cell is a flow cell and the anode chamber comprises a liquid anolyte having an anodic redox active material that is liquid regardless of oxidation state.

11. An automotive vehicle having a galvanic cell, the galvanic cell comprising:
an anode chamber;
a cathode chamber having a cathodic current collector and a liquid catholyte, the liquid catholyte comprising:
a fluoroalkylsulfonyl salt; and
a substituted or unsubstituted 1,4-benzoquinone, present at a molar ratio within a range of 0.2:1 to 2:1 relative to the fluoroalkylsulfonyl salt, and having a structure:

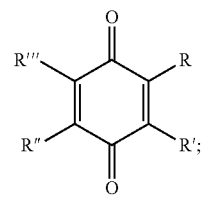

wherein each of R, R', R", and R'", is independently alkyl, alkoxy, or hydrogen; and a semi-permeable separator disposed between the anode chamber and the cathode chamber, wherein, during cell discharge, redox active material is oxidized in the anode chamber and reduced in the cathode chamber to produce energy.

12. The automotive vehicle of claim 11, wherein the 1,4-benzoquinone is selected from the group consisting of 2-methyl-1,4-bezoquinone; 2-t-butyl-1,4-benzoquinone; 2,6-dimethyl-1,4-benzoquinone; 2,6-di-t-butyl-1,4-benzoquinone; 2-i-propyl-5-methyl-1,4-benzoquinone; 2,3-dimethoxy-5-methyl-1,4-benzoquinone; and a mixture thereof.

13. The automotive vehicle of claim 11, wherein the fluoroalkylsulfonyl salt is selected from the group consisting of lithium bis(trifluoromethylsulfonyl)imide (LiTFSI), lithium bis(pentafluroethylsulfonyl)imide (LiBETI), lithium trifluromethylfulfonate, sodium bis(trifluoromethylsulfonyl)imide (NaTFSI), magnesium bis(bis(trifluoromethylsulfonyl)imide (Mg(TFSI)$_2$), and a mixture thereof.

14. The automotive vehicle of claim 11, wherein the galvanic cell is a flow cell and the anode chamber comprises a liquid anolyte having an anodic redox active material that is liquid regardless of oxidation state.

* * * * *